Figure 2:
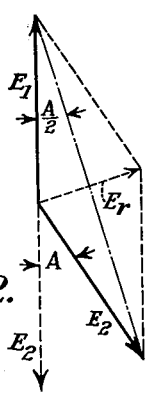

Nov. 4, 1952            C. R. MOORE            2,616,290

TRANSMISSION DYNAMOMETER

Filed June 5, 1947

Inventor
Charles R. Moore
By
Agent

Patented Nov. 4, 1952

2,616,290

UNITED STATES PATENT OFFICE 2,616,290

TRANSMISSION DYNAMOMETER

Charles R. Moore, Millburn, N. J., assignor to Marlow Pumps, Incorporated, Ridgewood, N. J., a corporation of New Jersey Application June 5, 1947, Serial No. 752,812

4 Claims. (Cl. 73—136)

This invention relates to improvements in transmission dynamometers and particularly to an improved construction of a transmission dynamometer employing resiliently coupled electromotive force generators as apparatus components.

A transmission dynamometer which is known in the art of torque and power measurement and described in U. S. Patent No. 925,180 to Jesse Harris includes a pair of sine wave generators, coupled by means of an appropriate resilient member and interposed between a source of power (prime mover) and a power consuming device to be tested. In operation, the sine wave generators in such a device, without a power consuming load, are arranged 180° out of phase so that the electromotive force generated by the two in series connection is zero. When a power consuming load is applied there will be deflection of the resilient coupling between the generators resulting in a shift of phase therebetween, and the resultant generator output may be used to indicate power applied to the power consuming load.

Springs having linear characteristics with respect to applied torque have been used as the resilient member between the two generators. For relatively small angles of phase shift between the generators the error in power measurement resulting by reason of the deviation of the law of a linear spring from that of the resultant voltage from the generators is small. Large errors in measurement occur, however, if the angular shift becomes substantial in value and, since a given power reading may involve the product of either a large torque and low speed or a small torque and high speed it is therefore highly desirable in the interest of accuracy that the law of the resilient member should be the same as the law of resultant voltage from the generators out-of-phase.

Springs which have been used as resilient couplings are long torsion rods, flat blades, helically coiled springs stressed torsionally about their longitudinal axes, and long rods in flexure, the latter of which are arranged in a squirrel-cage like assemblage. The first two types of springs have linear characteristics with applied torque over a very narrow range, unless they are made impractically long. The helically coiled spring has linear characteristics with applied torque near the zero angular position, however, the torque versus deflection curve varies substantially as the spring is stressed due to the fact that a smaller effective diameter results with stress in one direction or, a large effective diameter results with stress in the opposite direction.

According to my invention, I employ a pair of pure sine wave generators, one of which is directly connected to a prime mover and the other to the load. Coupling these generators is an improved style of resilient connection which is of such a nature that, if there is no load, there will be no relative movement between the generators. When a load is applied, the resilient coupling will permit a shift of one generator with respect to the other according to the torque required to drive the load. The generators are electrically connected in series opposition and are initially adjusted to produce equal voltages. The relative position of the two stators of the sine wave generators is made adjustable to provide a setting of the proper phase relation between the generated voltages at zero load. When a load is applied, the torque will cause a twist in the resilient element and the two generated voltages will no longer be 180° out-of-phase, but they will be displaced in phase by an amount proportional to the angular deflection of the resilient element, and the magnitude of the resultant voltage generated is proportional to the deflection in the resilient element and the speed of rotation. A suitable voltage reading instrument is provided to measure the voltage output.

The spring which forms the resilient coupling between generators is constructed in a manner by which a torque versus deflection curve is obtained having identical characteristics with the voltage resulting from the phase shift of the two generators. It is therefore possible to indicate power consumed accurately at any out-of-phase angle and at any speed by means of a voltmeter applied to the output circuit of the generators, irrespective of whether the deflection is large or small.

The novel features which are characteristic of my invention are set forth with particularity in the appended claims. My invention, however, both to its organization and to its method of operation will be better understood from reference to the following description when considered in connection with the accompanying drawings in which—

Figure 1:
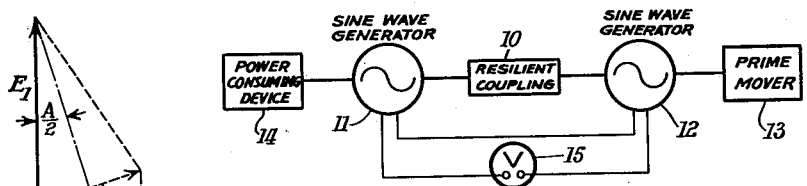
Figure 3:
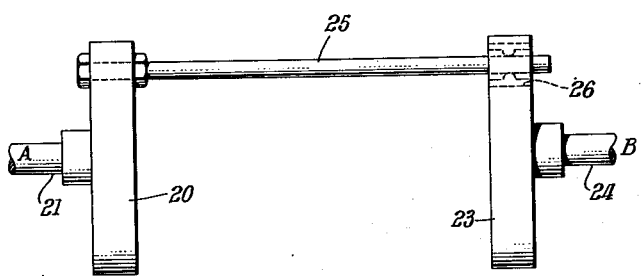
Figure 4:
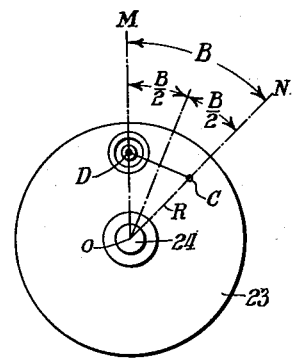
Figure 5:
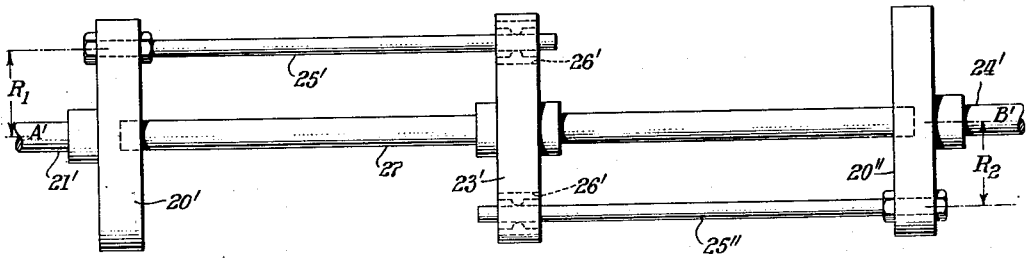

Figure 1 is a diagrammatic view to indicate the arrangement of apparatus of my invention, Figure 2 is a vector diagram from which certain calculations are made relating to the principles of operation of my invention, Figure 3 is a side elevation view to diagrammatically illustrate a part of the embodiment of my invention, Figure 4 is an end elevation of the apparatus of Figure 2, and Figure 5 is an elevation view illustrating the improved resilient member assembly of my invention.

Referring to the drawings, in Figure 1, the elements of my improved dynamometer are shown diagrammatically, numeral 10 indicating an improved resilient coupling interposed between a pair of pure sine wave alternating current generators 11 and 12 adjusted to generate equal voltages $E_1$ and $E_2$. A suitable prime mover 13 is directly connected to generator 12 and a power consuming device 14 is disconnectibly coupled with generator 11. The sine wave generators are electrically connected in series opposition, and suitable devices, not shown, are employed to adjust the position of the stator of generator 12 so that, when the dynamometer is operating without a power consuming load, the electromotive force generated by sine wave generators 11 and 12 connected in series is zero. A voltmeter 15 is used to indicate the voltage output of the generators, which, as will be presently understood, may be employed for a direct reading of power consumed when the power consuming device 14 is coupled with generator 11.

Sine wave generators are the simplest form of electromotive force devices, and the resultant wave form due to a phase shift between sine wave generators in series opposition is also sinusoidal. Referring to Figure 2, the vector diagram is illustrative of the effects of a simple phase shift. As explained, voltages $E_1$ and $E_2$ from generators 11 and 12 are equal and are placed in opposition when no power consuming load is applied, and the resultant voltage $E_r$ is zero. When there is a shift resulting from an applied load the electromotive force of generator 12 may be represented by the angularly disposed line $L_2$ and the angle between the $E_2$ without load and the $E_2$ with load is represented by A. Then, as may be calculated, the resultant voltage $$E_r = 2E_1 \text{ (or } E_2) \sin A/2 \qquad (1)$$

$$E_2 \text{ (or } E_1) = \frac{E_r}{2 \sin A/2} \qquad (1a)$$

From the above Equation 1 and the description which follows it will be evident that if power is to be indicated directly from the voltage output of the generators, resilient member 10 interposed therebetween must follow the law $$T = K \sin A/2 \qquad (2)$$

where T is torque and K is a constant.

In the description which follows, two problems are considered which follow the logic used in arriving at a solution for the construction of a spring or resilient member suitable for the above requirement. Referring to Figure 3, descriptive of apparatus relating to the first of these problems, the left hand disc 20 may be considered as directly connected through shaft 21 to a load. Disc 23 on the right hand side is directly connected thru shaft 24 to a source of power. Numeral 25 refers to a metal rod which is rigidly fixed in disc 20 and which projects through a clearance hole 26 in disc 23, with free flexure at the line of contact between rod 25 and the raised semi-circular section within the clearance hole. If disc 23 is turned on axis AB, flexure will result in the slender rod 25 until the restoring force set up in the rod equals the torque required to turn disc 20.

Referring now to Figure 4, the angle by which disc 20 lags behind disc 23, when disc 23 is turned counterclockwise, may be represented by the letter B where OM is a radial line in disc 23 and ON is a radial line in disc 20 each passing through one end of rod 25. The flexure of rod 25 will obviously be the distance CD, then $F_r$ = restoring force set up in the rod.
= a constant $x$ length of CD.
= $2KR \sin B/2$         (3)

where R is the radius from the center of the disc to the center of the rod.

This restoring force gives rise to a torque about the axis AB as follows:

$T$ = restoring force $x$ torque arm
= $2KR \sin B/2 . R \cos B/2$
= $2KR^2 \sin B/2 . \cos B/2$
= $KR^2 \sin B$.         (4)

From this we see that in terms of torque this particular style of spring is not linear, but is proportional to the sine of the displacement angle. From previous analysis, however, we have determined that a resulting electromotive force from two sine wave generators in series connection operating out-of-phase is proportional to the sine of half of the angle of deflection, and therefore this single spring of Figure 3 will not be satisfactory.

Considering now the second problem, and modifying the spring structure of Figure 3, we may use two such springs in tandem on the same general axis A'B' as shown in Figure 5. Left hand disc 20' is directly connected through shaft 21' to a load. The right hand disc 20'' is directly connected to a source of power through shaft 24'. Slender rods 25' and 25'' are fixed in discs 20' and 20'' respectively and extend through clearance holes 26' in the free intermediate disc 23'. Supporting shaft 27 for disc 23' is arranged to turn freely in central bearings located in discs 20' and 20''.

If shaft 24' is turned on axis A'B', with a load coupled to shaft 21', an angle of displacement B will be developed between the left hand disc 20' and the center disc 23'. The torque, in terms of this angle, will be proportional to the sine. If both flexing rods 25' and 25'' are alike, and if the radii $R_1$ and $R_2$ from the axis A'B' to the center lines of rods 25' and 25'' are alike, then a similar angle of displacement will be developed between the center disc 23' and right hand disc 20'', and the torque will also be proportional to the sine of angle B. The total angle of displacement between left hand disc 20' and right hand disc 20'' will be an angle A, equal to $2 \times B$; or:—

$$B = A/2$$

Substituting this in the torque Equation 4 derived above, we will have:

$$T = KR^2 \sin A/2$$

If now the assembly of Figure 5 is employed as the resilient coupling 10 of Figure 1, and is interposed between sine wave generators 11 and 12, both the resultant voltage and the torque follow the same law, and will be proportional to the sine of half the displacement angle.

For the complete apparatus, and using the following $P$ = Horsepower
$T$ = Torque
$K$ = A constant
$S$ = Speed Then
$$P = K\, T\, S$$
$$= K_1 R^2 \sin A/2 \cdot S$$

But, equal voltages are developed in the sine wave generators 11 and 12 proportional to speed, and $$S = K_2 E_1 (\text{or } E_2)$$

Therefore
$$P = K_3 R^2 \sin A/2 \cdot \frac{E_r}{2 \sin A/2}$$
$$= K_4 E_r$$

Since power is equal to a constant times the resultant voltage, it follows that a simple voltmeter may be used to indicate power consumed.

Various modifications of the physical embodiment of the invention may be made to adapt the apparatus to particular applications. For example, instead of using a single pair of rods in flexure, a plurality of pairs may be employed where the range of horsepower to be measured would be destructive of a single pair. Likewise, materials for the component parts of the apparatus may be chosen which are most suitable for the application at hand.

I claim:

1. In a power transmission system including a prime mover and a power consuming device, the combination comprising a pair of generators driven by the prime mover, electrically connected in series, and mechanically connected with each other through a resilient coupling; said resilient coupling comprising a plurality of gyratory, cantilever flexure members with their free ends in mutual opposition having torque versus deflection characteristics proportional to the sine of half of the angle of torsional displacement.

2. In a power transmission system including a prime mover and a power consuming device, the combination comprising a pair of generators driven by the prime mover, electrically connected in series, and mechanically connected with each other through a resilient coupling; said resilient coupling comprising a plurality of cantilever flexure members supported for gyration with respect to the generator axes with their free ends in mutual opposition having torque characteristics the same as the combined generated electromotive force characteristics of the generators.

3. In a power transmission system including a prime mover and a power consuming device, the combination comprising a pair of generators driven by the prime mover, electrically connected in series opposition, and mechanically connected through a resilient coupling; said resilient coupling comprising a pair of gyratory, cantilever flexure members, one of said pair being fixed for gyration with respect to the axis of each generator and with their free ends in mutual opposition having torque versus deflection characteristics corresponding to the combined generated electromotive force characteristics of the generators operating out-of-phase.

4. In a power transmission system including a prime mover and a power consuming device, the combination comprising a pair of generators driven by the prime mover, electrically connected in series, and mechanically coupled through a resilient coupling comprising a plurality of gyratory cantilever flexure members with their free ends in mutual oppositon, and an instrument for reading the electromotive force output from the generators; said resilient coupling having torque versus deflection characteristics which follow the law of output of the generators.

CHAS. R. MOORE.

REFERENCES CITED

The following references are of record in the file of this patent:

UNITED STATES PATENTS

| Number | Name | Date |
| --- | --- | --- |
| 1,111,848 | McCoy | Sept. 29, 1914 |
| 1,685,964 | Smith | Oct. 2, 1928 |
| 2,244,621 | Hurt | June 3, 1941 |
| 2,346,976 | Langer | Apr. 18, 1944 |